Nov. 15, 1938.　　　　B. H. SMITH　　　　2,137,066

INSTRUMENT SCALE LENGTH MULTIPLIER

Filed June 26, 1936

WITNESSES:
Michael Stark
Chas. C. Groome

INVENTOR
Benjamin H. Smith.
BY
ATTORNEY

Patented Nov. 15, 1938

2,137,066

UNITED STATES PATENT OFFICE 2,137,066

INSTRUMENT SCALE LENGTH MULTIPLIER

Benjamin H. Smith, Bloomfield, N. J., assignor to Westinghouse Electric & Manufacturing Company, East Pittsburgh, Pa., a corporation of Pennsylvania Application June 26, 1936, Serial No. 87,371

3 Claims. (Cl. 171—95)

The invention relates to electrical measuring instruments and particularly to instruments of the d'Arsonval, repulsion-vane and similar types.

Indicating instruments of this general type which are now in general use are capable of a scale length indication of 90° or less. This is by reason of the fact that the shaft of the coil or vane, to which the indicating hand is secured, is capable of only about a 90° rotation.

The desire has been frequently expressed for an instrument of this type having a substantially greater scale length to increase the accuracy of readings and to facilitate making such readings.

Accordingly, it is an object of the present invention to provide an indicating instrument of the moving-coil or repulsion-vane type with a pointer movable over a scale which may be as much as 360°, if desired. This is accomplished, in accordance with the invention, by providing a gearing between the shaft of the instrument movement and the spindle upon which the indicating pointer is mounted which magnifies the movement of the latter with respect to the former.

It is known that gearing between meter movements and their indicating pointers is broadly old. However, in such cases the instrument is of a type which develops a substantial torque, making the problem a simple one. With the electrical indicating instrument of the moving-coil or repulsion-vane type, however, the power developed in the movement is very small and the addition of gearing of any kind has been considered prohibitive. In the construction hereinafter described, the effect of friction in the gearing and the undesirable backlash in such gearing has been eliminated or reduced to a point where the instrument movement torque can accurately drive the indicating pointer.

Figure 1:
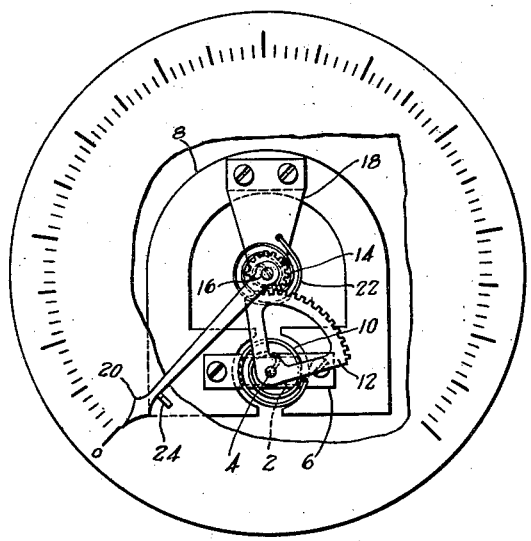
Figure 2:
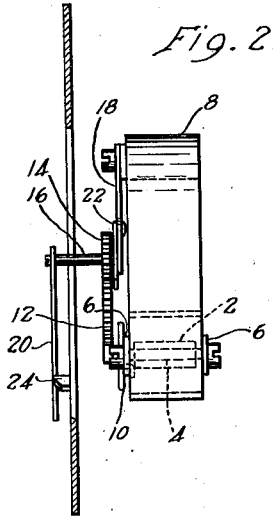

Referring to the accompanying drawing:

Figure 1 is a view in front elevation of an indicating instrument movement with a portion of the face broken away to disclose the details of the present invention; and Fig. 2 is a view partly in section and partly in side elevation of the instrument movement shown in Fig. 1.

For purposes of illustration, the indicating instrument movement shown and described is of the d'Arsonval or moving-coil type having a movable coil 2 fixed to a shaft 4 journaled in suitable bearings or arbors 6 mounted across the poles of a permanent magnet 8. As is well understood, energization of the coil 2 causes a reaction with the field of the permanent magnet 8 to rotate the coil and its shaft 4. In this type of instrument, the movement of the shaft 4 is restrained by a carefully calibrated spiral spring 10 which tends to rotate the shaft 4 toward a zero position. Quite obviously, with this type of construction, an indication of more than 90° is not desirable, and quite obviously, the torque developed is quite low.

A segmental gear 12 is rigidly secured to the shaft 4 for rotation therewith and drives a pinion 14 secured to a spindle 16 rotatably supported as by a bracket 18 depending from the permanent magnet. The gearing arrangement is such that, with the construction shown, a 90° rotation of the shaft 4 will move the spindle 16 and the pointer 20 secured thereto through approximately 270°.

A second spiral spring 22 has one end thereof secured to the bracket 18 and the other to the spindle 16 in such manner that it tends to bias the pointer 20 to the zero position on the scale, as shown. A stop 24 may be provided at the zero position for insuring that the pointer does not go below such point.

Although the spiral spring 10 is inherently very weak because the torque which it opposes is very small, the spiral spring 22 is preferably of the lowest strength obtainable and substantially less than that of the spring 10. The principal function of the spring 22 is to prevent backlash between the gears 12 and 14. The gearing, of course, and particularly the segmental gear 12, is of very light construction to minimize the load imposed on the shaft 4, and to minimize friction. The spring 22 opposes, to a slight degree, the torque of shaft 4, but introduces no error in the instrument reading because the instrument is calibrated with both springs in operation.

In accordance with the construction described, an instrument having a scale much longer than those heretofore used is possible without sacrificing the accuracy of the indication which would usually be caused by friction in the gearing or other additional load on the movement of the armature shaft.

Quite obviously, the construction disclosed is equally applicable to other types of low-torque instruments in which the armature is capable of only a limited movement. Also, modifications in the construction illustrated may be resorted to without departing from the spirit of the invention, and it is intended that no limitations shall be placed upon the invention except as imposed by the prior art and appended claims.

I claim as my invention:

1. An electrical indicating instrument having a rotatable armature capable of rotation through 90° or less, and a spiral spring for biasing it to a zero position, an indicating pointer and a spindle for rotatably mounting it for movement over a scale substantially greater than 90°, means constituting a driving connection between said armature and spindle to move the pointer substantially completely over said scale, and a second spiral spring for biasing said pointer toward a zero position on said scale, said second spring being substantially weaker than the first mentioned spring.

2. An electrical indicating instrument including a shaft and means for rotating it in response to an electrical quantity to be measured, an indicating pointer and a spindle for rotatably mounting it for movement with respect to an arcuate scale, gearing constituting a driving connection between said shaft and spindle comprising a segmental gear secured to said shaft for cooperation with a gear secured to said spindle, a restraining spring operating on said shaft to bias it against the force exerted by the measured quantity, and a spring for biasing said spindle to its zero position with respect to said scale, the spring on said spindle being substantially weaker than that on said shaft and being of just sufficient strength to maintain driving connection between said gears to avoid backlash therebetween.

3. An electrical indicating instrument including a shaft and means for rotating it in response to an electrical quantity to be measured, an indicating pointer and a spindle for rotatably mounting it for movement with respect to an arcuate scale, gearing constituting a driving connection between said shaft and spindle, a calibrated restraining spring for said shaft for biasing it against the force exerted by the measured quantity, and a second spring mounted to bias said spindle against rotation by said driving connection, said second spring being only of sufficient strength to maintain continuous contact between the gearing of the driving connection to prevent backlash therein.

BENJAMIN H. SMITH.